A. B. G. A. WILLIAMS.
Bearings for Journals.

No. 165,397. Patented July 6, 1875.

Attest:
Jo. L. Coombs
Albert H. Norris

Inventor.
Aaron B. & G. A. Williams
By James L. Norris.
his atty.

UNITED STATES PATENT OFFICE.

AARON B. G. A. WILLIAMS, OF GOSHEN, INDIANA, ASSIGNOR OF ONE-HALF TO RUEL M. JOHNSON, OF SAME PLACE.

IMPROVEMENT IN BEARINGS FOR JOURNALS.

Specification forming part of Letters Patent No. 165,397, dated July 6, 1875; application filed May 7, 1875.

*To all whom it may concern:*

Be it known that I, AARON B. G. A. WILLIAMS, of Goshen, in the county of Elkart and State of Indiana, have invented certain new and useful Improvements in Bearings for Journals, of which the following is a specification:

This invention relates to certain new and useful improvements in journal-boxes for shafting and other similar purposes; its object being to provide a ready means of renewing the bearing-surface of the shaft or axle when worn; and the invention consists in a detachable cylindrical sleeve confined within a journal-box and rigidly attached to the shaft revolving in the box, the caps or heads of the journal-box being provided with packing-washers to prevent wear of the sleeve and the escape of oil, as hereinafter fully set forth.

Figure 1:
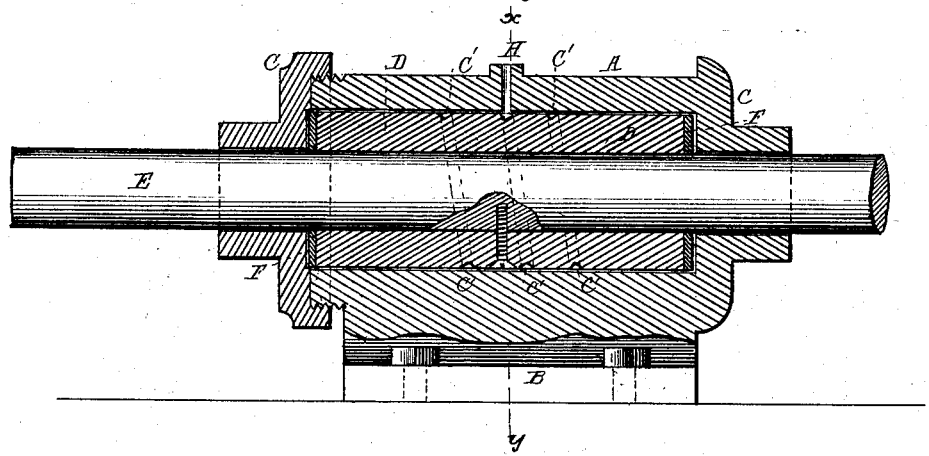
Figure 2:
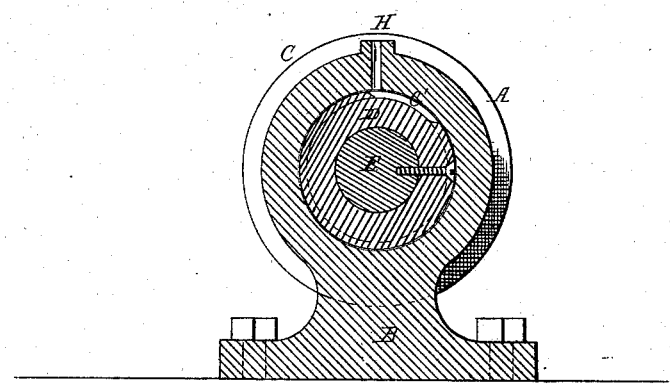

In the drawing, Figure 1 represents a longitudinal section of my invention, and Fig. 2 a transverse section of the same on the line $x\ y$, Fig. 1. The letter A represents the journal-box, constructed in any approved manner, and secured to a suitable support, B, as ordinarily practiced. In the present instance, a cylindrical box is represented, having a removable head, C, at one or both ends. D represents the detachable sleeve, adapted to fit in the chamber or bore of said box, and being rigidly fastened to the shaft revolving in the box, and the sleeve is accurately turned to fit the box, and also to fit the shafts. The heads C C of the box are bored centrally for the passage of the shaft E, and between each of the same and the sleeve D is secured a washer, F, to prevent any longitudinal play of the sleeve and shaft, and which washers prevent any wear of the ends of the sleeve and the box, and also prevent any escape of the oil at this point. C' represents a spiral longitudinal or annular groove formed on the interior of the sleeve, and communicating with an oil-passage, H, in the journal-box and provided with the usual oil-cup for supplying the lubricating material to the bearing-surfaces of the sleeve and journal-box. Either of the heads C C, or both, as before stated, may be made removable for the purpose of removing the box, in order to detach the sleeve from the shaft and replace it by a new one, said heads being provided with internal screw-threads, fitting over external screw-threads on the box, or being otherwise adapted to be fastened thereto.

It will be seen by the above construction that, when the bearing-surface of the sleeve and journal-box becomes worn so as to allow the shaft to play too loosely therein, the said sleeve can be removed and replaced in a few moments, rendering the shaft as perfect as when first made, at comparatively little expense or labor, since there is no wear upon the shaft, the entire wear being upon the journal-box and the sleeve.

Having thus fully described my invention, what I claim, and desire to secure by Letters Patent, is—

The combination of the journal-box A, the sleeve D rigidly connected to the shaft E, and the removable head or heads C, applied to the journal-box, and each provided with packing-washers F, for preventing wear of the sleeve and the escape of oil, substantially as described.

In testimony that I claim the foregoing, I have hereunto set my hand.

AARON B. G. A. WILLIAMS.

Witnesses:
GEO. F. ALDERMAN,
J. M. CARPENTER.